W. F. RITTMAN.
MANUFACTURE OF GAS.
APPLICATION FILED FEB. 28, 1916. RENEWED MAY 27, 1919.
1,329,853.
Patented Feb. 3, 1920.
2 SHEETS—SHEET 1.
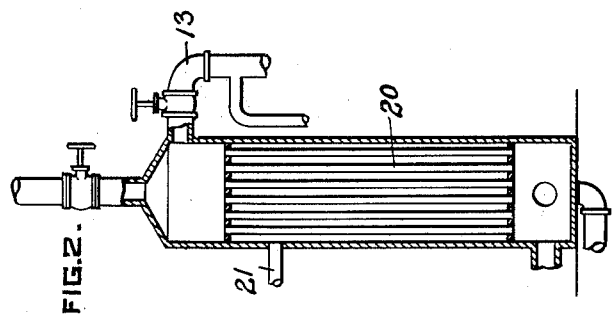
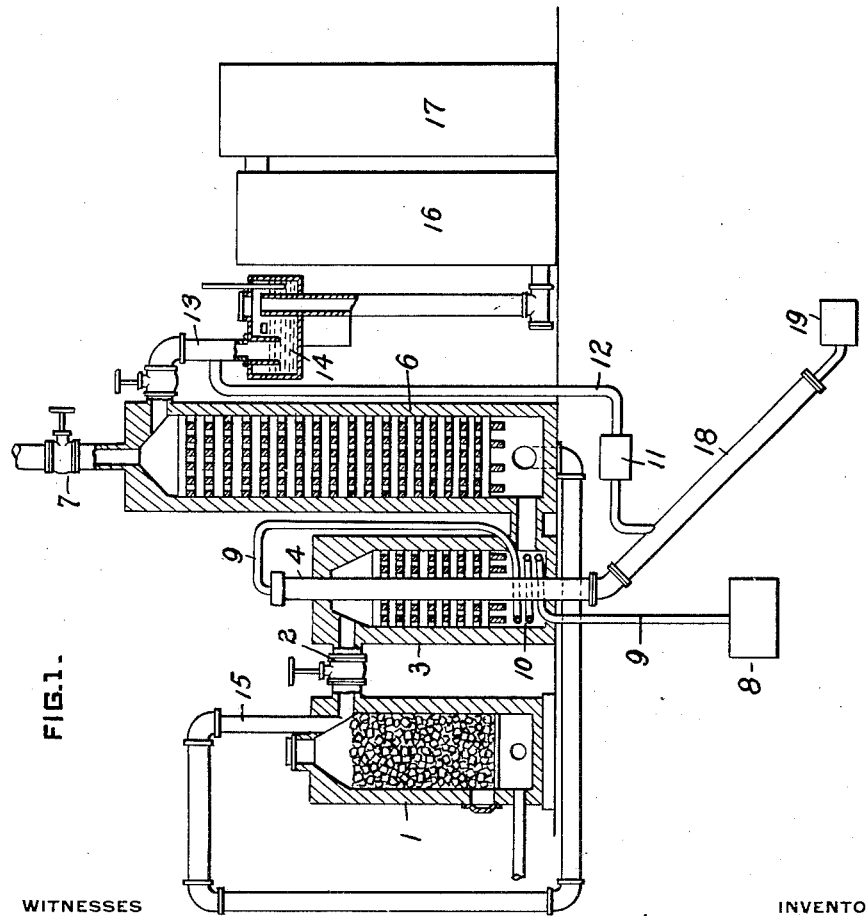
WITNESSES
INVENTOR W. F. RITTMAN.
MANUFACTURE OF GAS.
APPLICATION FILED FEB. 28, 1916. RENEWED MAY 27, 1919.
1,329,853.
Patented Feb. 3, 1920.
2 SHEETS—SHEET 2.
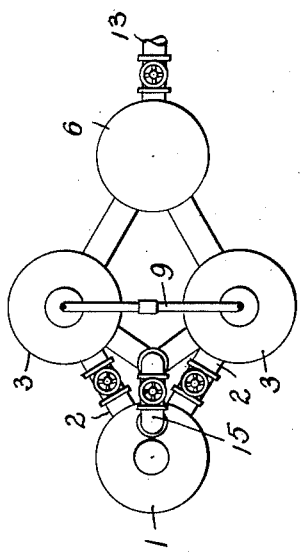
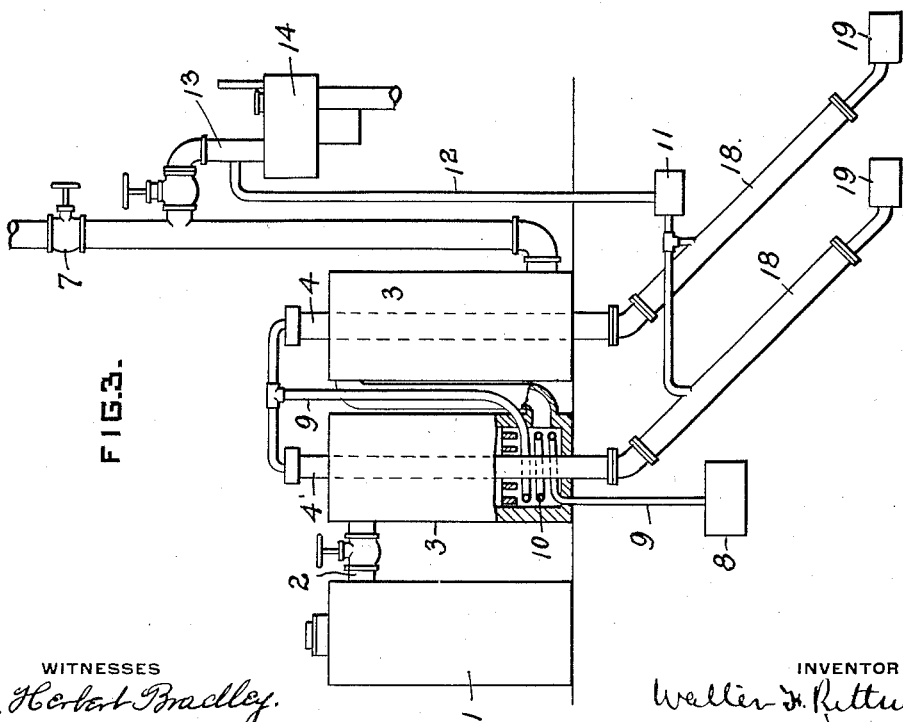
WITNESSES
INVENTOR

UNITED STATES PATENT OFFICE.

WALTER F. RITTMAN, OF PITTSBURGH, PENNSYLVANIA, ASSIGNOR TO SYNTHETIC HYDROCARBON COMPANY, OF PITTSBURGH, PENNSYLVANIA, A CORPORATION OF DELAWARE.

MANUFACTURE OF GAS.

1,329,853.   Specification of Letters Patent.   Patented Feb. 3, 1920.

Application filed February 28, 1916, Serial No. 80,955. Renewed May 27, 1919. Serial No. 300,192.

*To all whom it may concern:*

Be it known that I, WALTER F. RITTMAN, residing at Pittsburgh, in the county of Allegheny and State of Pennsylvania, a citizen of the United States, have invented or discovered certain new and useful Improvements in the Manufacture of Gas, of which improvement the following is a specification.

In the manufacture of water gas, it has been the custom to introduce into the carbureting chamber, during the passage of the blue gas therethrough, hydrocarbon oil which is vaporized and cracked by contact with the highly heated checker work contained in the carbureting chamber, and in this vaporous form, passes on with the blue gas through the super-heater, scrubbers, etc. In this method of making gas, in which the oil is merely cracked, only comparatively small quantities of ethylene, etc., are produced, and this is especially true as regards the grade of oil, which the high cost of paraffin oil has compelled manufacturers to employ.

The invention described herein has for its object the production of gases of the ethylene and other unsaturated series from hydrocarbons and the mixing of the gases of these series with the water gas formed by blowing steam through the incandescent fuel of the producer.

Gases of the ethylene and other unsaturated series can be readily and easily produced, and in comparatively large quantities, by gasifying hydrocarbons varying widely as regards their chemical constitution and subjecting such hydrocarbons in a gaseous condition to suitable conditions of temperature and pressure for a suitable time. Under the term hydrocarbons, as used herein, are included those of the petroleum type and also those which can be derived from petroleum or from peat, lignite, bituminous coal, cannel coal, shale, and other hydrocarbon bearing materials.

The gases produced by the method above stated are principally of the ethylene and other unsaturated series and are, therefore, very much higher in thermal values and illuminating qualities than any gases produced by the vaporization and cracking of hydrocarbon oils, as now practised in the manufacture of water gas. Equal illuminating effects are obtained by mixing a smaller volume of the ethylene, etc., per 1000 cubic feet of water gas. The invention is hereinafter more fully described and claimed.

In the accompanying drawings forming a part of this specification, Figure 1 is a sectional elevation showing in a schematic way the form of apparatus adapted for the practice of the invention; Fig. 2 is a sectional elevation of a suitable form of steam generator which may be employed; Fig. 3 is a view partly in elevation and partly in section of a modified form of the apparatus; and Fig. 4 is a plan view showing a form of a unit employed in the apparatus shown in Figs. 1 and 3.

In the practice of my invention, the water gas is produced, as has heretofore been customary, by blowing steam through an incandescent mass of coke for a period of time, and when the coke in the producer 1 has become reduced to a practically ineffective temperature, air is blown through to bring the mass up to an incandescent condition. Roughly stated, air is blown through the producer for about four minutes, when the air is cut off and steam is forced through for approximately the same period, producing blue or water gas. The producer 1, which may be of any suitable construction or form, is connected by a throat 2, provided with a valve, to the upper end of a furnace 3, containing a vertically arranged tube 4, surrounded by checker work of refractory brick. In the form of apparatus shown in Fig. 1, the blast gases, formed by blowing air through the incandescent fuel, are passed through the checker work in the furnace 3, thereby heating the tube 4 to the necessary temperature for the vaporization and gasification of the oil and the cracking of such vapors and gases as will be hereinafter described. From the lower portion of the furnace, a connection is made to the lower end of a superheater 6, so that the gases will pass up and highly heat the checker work forming the super-heater. From the superheater, the blast gases are allowed to escape through a stack provided with a suitable cutoff valve 7, which, however, will be closed and the valve in pipe 13, opened while water gas is being formed.

For the production of gases of the ethylene or other unsaturated series, a hydrocarbon is introduced into the upper end of the tube 4, preferably in the form of a liquid, although the hydrocarbon may be vaporized previous to its introduction into the tube. If the hydrocarbon is in a liquid form, the tube 4 should be heated at and near its upper end, to a temperature of 700° C., more or less, at which the liquid will be vaporized and gasified practically instantaneously on entering the tube. The vapors and gases thus formed pass down into what is known as the reaction zone, in which such conditions of temperature and pressure are maintained as will effect a cracking of the vapors and gases and promote that recombination of the molecules, characteristic of the ethylene and other unsaturated series. It has been found that the conditions favorable for the formation of gases of the ethylene and other unsaturated series are a high temperature and a low pressure. It has also been found that the percentage of gases of the ethylene and other unsaturated series formed, will be largely increased if in addition to subjecting the vapors and gases formed by cracking to a high temperature, they be subjected to conditions other than heat, tending to separate and hold apart the molecules. Hence, while the gases may be caused to move through the reaction zone by any suitable means, it is preferred to pull them through, and to this end, a pressure is maintained on the discharge end of the reaction zone, substantially lower than that on the feed side.

In the apparatus shown, the oil is forced by a suitable means indicated at 8, through a pipe 9, into the upper end of the tube 4, where it is instantaneously vaporized and gasified. If desired, the oil previous to being fed into the tube 4, may be preheated by including as a part of the pipe 9, a coil 10, arranged at the lower end of the tube furnace 3, so as to be subjected to the heat of the gases passing therefrom.

As before stated, the oil is vaporized and gasified in the upper end of the tube, and the vapors and gases resulting from cracking, pass down into the reaction zone, which is maintained at a suitable temperature for cracking, i. e., about 1600 degrees F. It has been found that the formation of the unsaturated hydrocarbon series, such as ethylene, will assume greatly increased commercial importance at low pressures and the yield of hydrocarbons of the ethylene and other unsaturated series will be greatest at pressures of about four pounds absolute and lower. In order to obtain these reduced pressures, the lower portion of the tube 4 is connected to a suitable vacuum apparatus, indicated at 11, whereby a low pressure preferably four pounds absolute or less is maintained within the tube. From the vacuum apparatus, the gases formed in the tube 4 are conducted by a pipe 12 to a suitable point for mingling with the water gases. In the construction shown, the pipe 12 is connected to the pipe 13, at a point intermediate of the super-heater and the water seal 14.

After the fuel in the producer has been raised by blowing air therethrough to the desired state of incandescence, steam is forced into the lower end of this producer and passes up through the incandescent mass where it is decomposed, forming blue or water gas, which is conducted from the producer by a pipe 15 to the lower end of the super-heater, through which it is passed, while the latter is in a highly incandescent state. From this super-heater, the blue or water gas passes by the pipe 13, within which it is mingled with the enriching gas, as before stated, and flows through the water seal 14, and through the scrubbers and cleaners, indicated at 16 and 17.

The lower end of the tube 4 is connected to the upper end of the receiving chamber 18, for the reception of any distillate or carbon which may be formed in the tube. From this chamber 18, the distillate such as tar, etc., is collected in sump 19, from which it may be drawn and again passed through the tube 4 for the further production of gases of the ethylene series.

In lieu of passing only the blast gases formed in blowing up the charge in the producer, through the furnace 3, the blue or water gas may also be directed through the furnace containing the tube 4 and its heat utilized in forming ethylene, etc.

If desired, the form of apparatus shown in Fig. 4, having two furnaces 3, containing tubes 4, may be employed, said furnaces having valved connections with the producer, so that producer gas may be caused to pass through one of the furnaces, and water gas through the other. Or both forms of gas may be pasesd through both furnaces in succession.

In lieu of either form of apparatus shown in Figs. 1 and 4, two or more furnaces 3 may be arranged in tandem, as shown in Fig. 3, and producer gas alone, or producer and water gas in succession may be passed successively through these furnaces.

As, in some cases, the superheating of the water gas may not be necessary, the superheater 6 may be omitted, as indicated in Fig. 3. And further, as both the blast and the water gases are at a high temperature after passing through the furnace or furnaces 3, the heat thereof may be employed for the generation of steam for the production of water gas. When such further utilization of the gases is desired, a boiler of the type shown in Fig. 2 or of any other suitable construction may be added to either form of apparatus shown in Figs. 1, and 3, or may be substituted for the super-heater. In the form of steam generator, shown in Fig. 2, the hot gases pass through the tubes 20, highly heating the body of water through which the tubes pass. The blast gases escape through the stack, while the blue or water gas escapes through pipe 13, the valve in the stack being closed during the production of water gas. The steam outlet pipe 21 is connected to the lower portion of the producer 1.

It is characteristic of the invention described herein, that the heat generated in the producer is utilized in producing the conditions of temperature required in the formation of the ethylene and other unsaturated series of hydrocarbons, and that the production thereof is continuous.

As is well known, a very considerable percentage of the oil is lost in the form of carbon, tar, etc., in the water gas process in use, whereas in the practice of the invention described herein, practically all of the hydrocarbons treated are changed into gases, having valuable thermal and illuminating qualities. And further, it has been found that by passing the water gas through the super-heater, certain reactions among the constituents of the gas are induced, resulting in the production of certain hydrocarbons.

I claim herein as my invention:—

1. The method herein described of manufacturing gas, which consists in alternately forcing air and steam through a body of incandescent carbonaceous material, utilizing highly heated gases formed in the producer to gasify and crack a hydrocarbon liquid out of contact therewith, subjecting the gases to a pressure not greater than ten pounds absolute, and mingling the hydrocarbon gases thus produced with the gases formed by the passage of the steam through the highly heated carbonaceous material.

2. The method herein described of manufacturing gas which consists in alternately forcing air and steam through a body of incandescent carbonaceous material, utilizing highly heated gases formed in the producer to gasify and crack a liquid hydrocarbon out of contact therewith, subjecting the gases to a pressure not greater than four pounds absolute, and mingling the hydrocarbon gases thus produced with the gases formed by the passage of steam through the highly heated carbonaceous material.

3. The method herein described of manufacturing gas which consists in alternately forcing air and steam through a body of incandescent carbonaceous material, utilizing the blast gases to gasify and crack a liquid hydrocarbon out of contact therewith, subjecting the gases to a pressure not greater than four pounds absolute, and mingling the hydrocarbon gases thus formed with the gases formed by the passage of steam through the highly heated carbonaceous material.

4. The method herein described of manufacturing gas, which consists in alternately forcing air and steam through a body of incandescent carbonaceous material, utilizing highly heated gases formed in the producer to gasify and crack a hydrocarbon liquid out of contact therewith, subjecting the gases to a pressure not greater than ten pounds absolute, passing the blue or water gas through a super-heater and mingling the latter gases with the gases resulting from the treatment of the hydrocarbons.

5. The method herein described of manufacturing gas, which consists in alternately forcing air and steam through a body of incandescent carbonaceous material, utilizing the highly heated gases formed in the producer to crack a hydrocarbon fluid out of contact therewith, subjecting the cracked gases or vapors to a pressure not greater than ten pounds absolute, and mingling the hydrocarbon gases and vapors thus produced with the gases formed by the passage of the steam through the highly heated carbonaceous material.

6. The method herein described which consists in forcing air and steam through a body of incandescent carbonaceous material, utilizing the highly heated gases thus produced to crack hydrocarbon fluids while out of contact therewith, and mingling the hydrocarbon gases and vapors produced by the cracking with the gases formed by the passage of steam through the highly heated carbonaceous material.

In testimony whereof I have hereunto set my hand.

WALTER F. RITTMAN.

Witness:
    ALICE A. TRILL.